Nov. 22, 1949

N. E. MOORE 2,489,102

COMPOUND TOOL

Filed Jan. 11, 1946

INVENTOR.
N. E. MOORE
BY
Merrill M. Blackburn,
attorney.

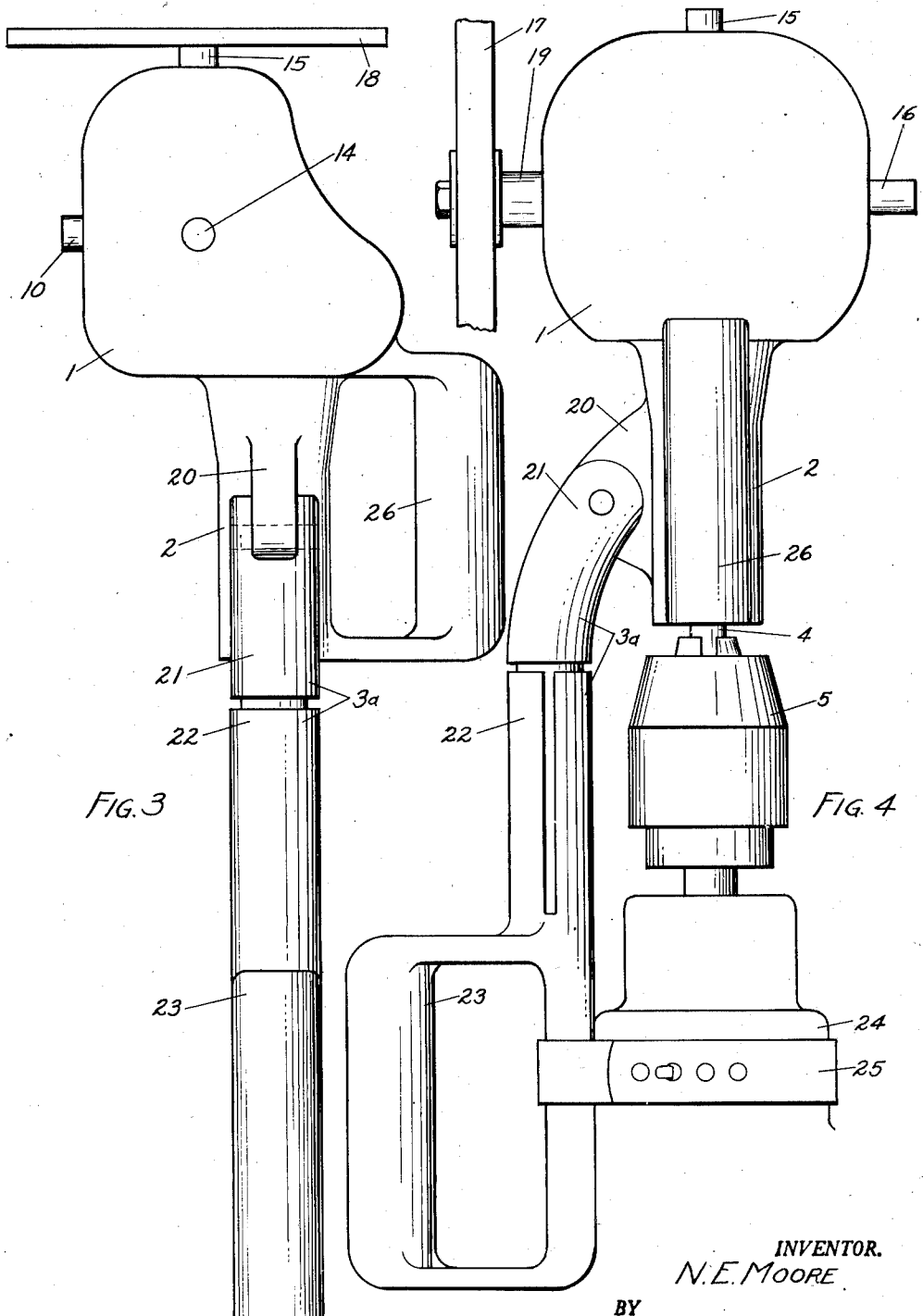

Patented Nov. 22, 1949

2,489,102

UNITED STATES PATENT OFFICE 2,489,102

COMPOUND TOOL

Noble E. Moore, Davenport, Iowa

Application January 11, 1946, Serial No. 640,608

2 Claims. (Cl. 74—665)

My present invention relates to a tool for attachment to an ordinary drill chuck which is power driven. Among the objects of this invention are the provision of a tool for operation, in accessible or inaccessible places, of such elements as grinding wheels, rotary cutting blades, buffing wheels, and the like; the provision of an apparatus of the type indicated which is adapted to be connected to the chuck of a drill and have tools of various types, such as grinding, cutting, and buffing elements connected thereto to operate in the direction of the axis of the tool or transversely thereto; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 3 represents a view similar to that of Fig. 2, showing another form of construction; and Fig. 4 represents a view of the construction shown in Fig. 3, rotated ninety degrees (90°) about its axis.

Figures 1, 2:
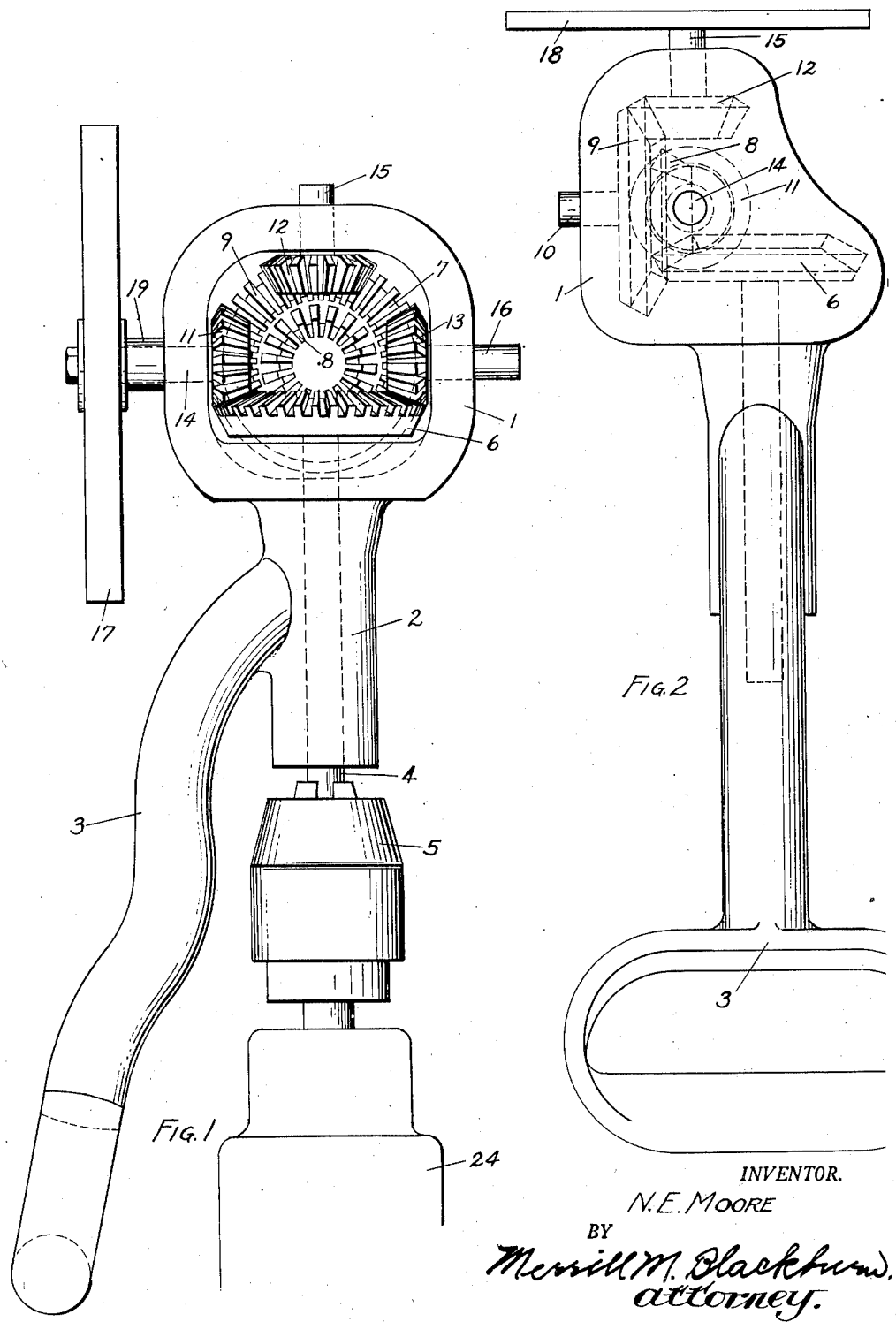
Fig. 1 represents a plan view of a tool constructed in accordance with my invention.
Fig. 2 represents a similar view of this implement rotated through an angle of ninety degrees (90°) about the axis of the implement and with a different type of tool applied to one of the shafts in substitution for the grinding unit shown in Fig. 1.

Reference will now be made in greater detail to the annexed drawings for a more complete description of this invention. There is a hollow body 1 from which projects the shank 2 to which is attached a handle 3. Through the shank 2, is a longitudinal opening formed therein, extends a shaft 4 which may be engaged by the chuck 5 of a drill. The purpose of this is to provide rotary motion for the shaft 4 and the bevel gear 6 mounted upon the inner end of this shaft. Within the hollow body or housing 1 and meshing with the gear 6 is a compound bevel gear 7 comprising the inner gear element 8 and the outer gear element 9. The shaft 10 upon which the compound gear 7 is mounted may extend through the wall of the housing 1, as shown in Fig. 2, for the attachment of any suitable cutting or polishing tool. While no definite gear ratio is required, I prefer to use a ratio of two to one for the gears 6 and 8. This will cause rotation of the shaft 10 at twice the speed of the shaft 4. Within the body or housing 1 are mounted three other beveled gears 11, 12, and 13 on suitable shafts 14, 15, and 16, which shafts, like those previously referred to, have suitable bearings in the walls of the body member. These gears 11, 12, and 13 mesh with the gear element 9 of the compound gear 7 and, being of a smaller size than the gear 9, they are driven more rapidly. I prefer to have the gear 9 twice the size of the gears 11, 12, and 13, but this is not an essential ratio. This ratio is chosen because it gives a desirable speed to the ultimate driven, cutting, or polishing element.

In Figs. 1 and 4, I have chosen to show a grinding wheel 17 attached to the shaft 14 but it will be understood that this or any comparable element may be attached to any one of the shafts projecting from the housing 1. It will be understood that, if the ratio of the gears 6 and 8 is as two to one, then any element mounted on the shaft 10 will turn twice as fast as the shaft 4. Similarly, grinding wheel 17 will be driven four times as fast as the shaft 4 is rotated. In Figs. 2 and 3, I have chosen to show a cutting tool 18 mounted on the shaft 15 for cutting transversely of the longitudinal extent of the housing 1 and its shank 2. It is clear that there are four shafts 10, 14, 15, and 16 upon which tools may be mounted. It is also obvious that a drill chuck may be connected to one of the shafts to hold a drill for operation in a location which is normally inaccessible for the use of a drill in the chuck 5.

A sleeve 19 is shown as mounted on the shaft 14 to space the grinding wheel 17 from the gear housing. Such as this may be used elsewhere, if needed, as, for example, on the shaft 16. The housing 1 is provided with a detachable cover which may be removed in order to gain access to the mechanism within the housing.

The handle 3a of Figs. 3 and 4 and the connection thereof to the remainder of the tool differ somewhat from the structure of Figs. 1 and 2. The shank 2 has an ear 20 projecting from one side thereof and connected to this, pivotally, is one section 21 of the handle 3a. This section has a reduced end portion which is receivable within the socket 22 of the section 23 adapted to be attached to the drill motor 24 by the band 25, adjustable in length to fit motors of different sizes. The handle section 23 may be adjusted relatively to section 21 to adapt it to fit drill mechanisms of different sizes. A handle 26 also projects from one side of the shank 2 which renders this form more convenient to use.

It will of course be understood that the specific description of structure set forth above may be departed from by various modifications without departing from the spirit of this invention as disclosed herein and as defined in the appended claims.

Having now described my invention, I claim:

1. In a tool of the nature described, a hollow body having a shaft extending therefrom to be attached to a drill chuck, said shaft having a bevel gear mounted on its end within the body, a compound gear within the body, said compound gear comprising two concentric bevel gears, mounted on a common shaft, the smaller of said concentric bevel gears being in mesh with the first bevel gear, the compound gear being mounted upon the inner end of a shaft extending through one wall of the body, and other shafts extending through other walls of the body and having other bevel gears mounted upon their inner ends, said other bevel gears being continuously in mesh with the outer bevel gear of said compound gear whereby to result in an increase in the rate of rotation of the ultimate driven shaft and its carried tool, said shafts, other than the first shaft, projecting beyond the body walls to support a cutting or grinding tool upon any one thereof.

2. In a tool for the purpose stated, a hollow body, and a plurality of shafts extending through walls of the body and each having a bevel gear mounted on its inner end portion, one of said gears comprising inner and outer coaxial bevel gears, one of the shafts being adapted to be connected to a power driven unit, the gear mounted on the inner end of that one shaft meshing with the inner one of the coaxial gears, and the remaining bevel gears meshing continuously with the outer coaxial gear, the ends of the shafts projecting through the body walls being adapted to have operating tools detachably and interchangeably mounted thereon.

NOBLE E. MOORE.

REFERENCES CITED

The following references are of record in the file of this patent:

UNITED STATES PATENTS

| Number | Name | Date |
|---|---|---|
| 96,192 | Berkely | Oct. 26, 1869 |
| 414,491 | Brundage | Nov. 5, 1889 |
| 1,571,773 | Force | Feb. 2, 1926 |
| 1,670,210 | Parker | May 15, 1928 |
| 2,283,722 | Chandler | May 19, 1942 |